US007103582B2

(12) United States Patent
Edens et al.

(10) Patent No.: US 7,103,582 B2
(45) Date of Patent: Sep. 5, 2006

(54) SETTING A SYSTEM FOR ASSEMBLING MAIL PIECES

(75) Inventors: Bertus Karel Edens, Drachten (NL); René Scheltes, Drachten (NL)

(73) Assignee: Neopost Technologies B.V., Drachten (NL)

( * ) Notice: Subject to any disclaimer, the term of this patent is extended or adjusted under 35 U.S.C. 154(b) by 475 days.

(21) Appl. No.: 10/029,160

(22) Filed: Dec. 28, 2001

(65) Prior Publication Data

US 2002/0087491 A1 Jul. 4, 2002

(30) Foreign Application Priority Data

Dec. 31, 2000 (NL) .................................... 1017017

(51) Int. Cl.
*G06F 17/00* (2006.01)

(52) U.S. Cl. ........................................ 705/401; 705/60

(58) Field of Classification Search ............ 705/60–63, 705/400–414; 707/1–6; 53/460–463, 394–395; 235/419–435
See application file for complete search history.

(56) References Cited

U.S. PATENT DOCUMENTS 4,800,505 A 1/1989 Axelrod et al.
4,985,013 A 1/1991 Van Der Werff et al.
5,157,617 A * 10/1992 Ramsey ...................... 700/223
5,362,037 A 11/1994 Van Der Werff et al.
5,538,232 A 7/1996 Long
6,173,274 B1 * 1/2001 Ryan, Jr. .................... 705/408
6,353,813 B1 * 3/2002 Breese et al. ................. 706/12
6,412,255 B1 * 7/2002 Hidding et al. ............... 53/460
6,714,835 B1 * 3/2004 Hart et al. .................. 700/220

FOREIGN PATENT DOCUMENTS

EP 0 628 357 A1 12/1994
EP 0 639 522 A1 2/1995
EP 0 781 671 A1 7/1997
EP 1084978 A1 * 3/2001

OTHER PUBLICATIONS

Becker et al., "The Masking Breakdown Point of Multivariate Outlier Identification Rules", Sep. 1999, Journal of the American Statistical Association, 94, 447, 947 (9), ISSN: 0162-1459.*

* cited by examiner

*Primary Examiner*—Mary D. Cheung
(74) *Attorney, Agent, or Firm*—Buchanan Ingersoll & Rooney, PC

(57) ABSTRACT

For machine-producing a series of mail pieces with the aid of a system for assembling mail pieces, the system registers at least one property of at least one physical, postal item of a particular type, at least one code representing the registered property is generated and compared with at least one reference code, stored in a memory, which represents at least one item-type property. If the code representing the at least one registered property exhibits at least a defined extent of agreement with the reference code or at least one of the reference codes, at least one setting code, associated with the reference code or at least one of the reference codes, which represents a system setting is selected; and the production of a series of mail pieces is carried out in accordance with the selected setting code.

15 Claims, 3 Drawing Sheets

SETTING A SYSTEM FOR ASSEMBLING MAIL PIECES

FIELD AND BACKGROUND OF THE INVENTION

The invention relates to a method for machine-producing a series of mail pieces, and to a computer program and a system for use therewith.

From practice, it is known to store, in a control unit of a system for assembling mail pieces, data which represent combinations of system settings which a user wishes to use repeatedly for particular applications. As a result, it is not necessary for the user to determine all settings of the system separately all over again every time.

However, due to the mail producing apparatuses being frequently operated by temporary personnel with little experience, the problem occurs that during the preparations of the mail producing apparatus prior to the production of a series of mail pieces under a predetermined system setting, problems arise in that the operator does not know which pre-stored set of settings is to be chosen. In other cases, the assembly of mail pieces proceeds inefficiently in that the order in which the production of series of mail pieces ("jobs") is carried out requires a great deal or re-loading of postal items such as, for instance, sheets to be printed, envelopes and inserts.

SUMMARY OF THE INVENTION

It is an object of the invention to provide a solution which makes it possible to simplify choosing pre-composed system settings.

This object is achieved according to the present invention by providing a method for machine-producing a series of mail pieces with the aid of a system for assembling mail pieces, comprising traversing a start-up phase comprising:

the system registering at least one property of at least one physical, postal item of a particular type;

generating a code representing the at least one registered property;

comparing said code representing the at least one registered property with at least one reference code, stored in a memory, which represents at least one item-type property; and in response to at least a defined extent of agreement between said code representing the at least one registered property and the reference code or at least one of the reference codes, selecting at least one setting code, associated with said reference code or at least one of the reference codes, representing a system setting; and during an operating phase following said start-up phase, producing a series of mail pieces with items of said item-type in accordance with the selected setting code.

The invention can also be embodied in a computer program for setting a system for producing mail pieces, comprising instructions for traversing a start-up phase, comprising:

causing the system to register at least one property of at least one physical, postal item of a particular type;

generating a code representing the at least one registered property;

comparing said code representing the at least one registered property with at least one reference code, stored in a memory, representing at least one item-type property; and in response to at least a defined extent of agreement between the at least one code representing a registered property and the reference code or at least one of the reference codes, selecting at least one setting code, associated with said reference code or at least one of the reference codes, representing a system setting;

and instructions for causing, during an operating phase following said start-up phase, a series of mail pieces to be produced from items of said item-type in accordance with the selected setting code.

The computer program, stored in a memory in a form readable by a computer system, can control the assembly of mail pieces for carrying out the proposed method.

The invention may be further embodied in a system for producing a series of mail pieces, comprising:

at least one station for processing postal items into a mail piece;

a sensor, for registering at least one type-property of an item;

a control structure communicatively linked with said sensor for receiving signals coming from said sensor, which signals represent at least one type-property of an item;

a memory for storing at least one reference code representing an item-type property and at least one setting code representing a system setting associated with said item-type property, which memory is communicatively linked with said control structure;

wherein the control structure is arranged for traversing a start-up phase comprising: comparing signals coming from the sensor with said reference code or reference codes stored in the memory, and, in response to at least a defined extent of agreement between said code representing the at least one registered property and the reference code or at least one of the reference codes, selecting at least one setting code, associated with said reference code or at least one of the reference codes, representing a system setting; and for controlling, during an operating phase following the start-up phase, the at least one station for producing a series of mail pieces from items of the item type with the system set in accordance with the selected setting code.

Such a system is specifically arranged for practicing the method according to the invention.

Due to the feature that prior to the production of a series of mail pieces the system registers at least one property of at least one physical, postal item of a particular type and, starting from the registered property or properties, a system setting is selected, the operator is assisted in selecting the correct system setting on the basis of postal items presented for processing. Further, the operator is enabled, in a simple manner, to select from a number of system settings that are to be used, such setting as exhibits the least difference between the required loading and the current loading of the system with postal items to be processed, so that the amount of reloading work remains as small as possible in each case.

Particularly advantageous embodiments of the invention are laid down in the depending claims.

In the following, the invention is further illustrated and elucidated on the basis of an exemplary embodiment, with reference to the drawing.

DETAILED DESCRIPTION

Figure 1:
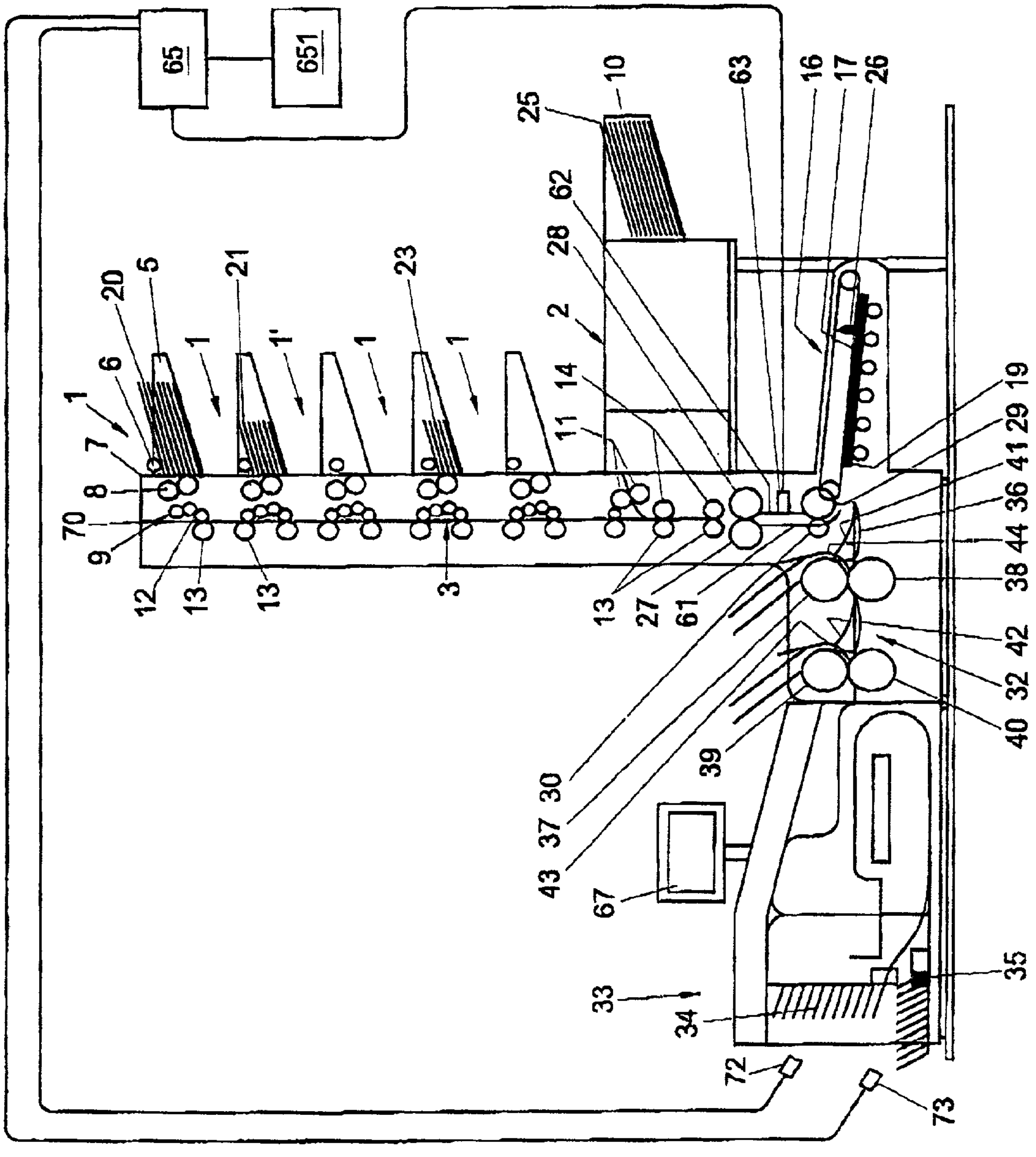
FIG. 1 is a schematic representation of a system according to the invention.

The system represented in FIG. 1 is equipped with a number of document feeder stations 1 for feeding documents 20, 21, 23 and envelope feeder stations 34, 35 for feeding envelopes. Connected to the system, further, is a printer 2 for printing sheets 25 and feeding printed sheets.

Each of the document feeder stations 1 has an associated tray 5 for holding insert documents to be supplied. For feeding the inserts, the feeder stations 1 are each provided with a feed roller 6, a separation roller 7, a transport roller 8 and a pair of delivery rollers 9. An example of a separation provision suitable for use in feeder stations 1 according to the exemplary embodiment shown is described in more detail in U.S. Pat. No. 5,362,087, which is hereby referred to.

A position of the system designated 1' is empty, apart from delivery rollers serving to pass on documents which are to be passed from upstream feeder stations along that position 1'. At this position 1', for instance a same feeder station as the feeder stations 1 can be placed, but also a special feeder station or a station for executing special operations, such as stamping passing documents or providing these with a sticker, a sachet or a plastic card.

The printer 2 is provided with a tray 10 for sheets 25 to be printed and a pair of feed rollers 11 for each time feeding a printed sheet at a suitable moment. The printer 2 is further designed and positioned such that the printing of a sheet in each case is completed before the sheet reaches a waiting position between the feed rollers 11.

The feeder stations 1 and the printer 2 link up with a feed track 3 having a series of opposite transport rollers 12, 13, 14.

The apparatus shown further comprises an aligning station 16 for aligning documents belonging to a set and any other postal items, to form a stack having document edges substantially in alignment on one side.

The aligning station 16 is designed as a terminal station with an aligning surface 19 with a stop 26 and a discharge track 36 in line with the aligning surface 19. Upstream of the aligning surface, the aligning station 16 has transport rollers 27, 28, 29, 30, and guides 61, 62. The aligning surface 19 is defined by a series of rollers.

The documents can be transported in the feeding direction as far as against the stop 26 and subsequently be discharged in the opposite direction to a folding station 32. The aligned document edges then form the trailing edge of the stack, which is advantageous in folding the stack.

Opposite the aligning surface 19, a conveyor belt 17 is arranged, which runs approximately parallel to the aligning surface 19, can exert some pressure on the aligning surface 19 and has a greater coefficient of friction relative to documents than does the aligning surface 19, which moreover is provided with rollers for further limiting the friction between documents and that surface. By driving the belt 17 in the direction of the stop 26, documents present between the aligning surface 19 and the belt 17 can be urged against the stop 26, so that the document edges are mutually aligned on the side of the stop 26.

By driving the conveyor belt 17, a document can be moved over the surface 19 as far as against the stop 26. A next document, which has been partly passed between the preceding document and the conveyor belt 17, will, moving over the preceding document, likewise move as far as against the stop 26 when the belt 17 is driven in the direction of the stop 26. Thus, successive documents can be aligned.

The folding station 32 is provided with a first and a second pair of folding rollers 37, 38 and 39, 40, with the discharge track 36 extending between the folding rollers 37, 38 and 39, 40. Provided between the stop 26 and the folding rollers 37, 38 and 39, 40, respectively, are deflectors 41 and 42 for deflecting the edge of a stack remote from the stop 26. Opposite a folding nip between each pair of folding rollers 37, 38 and 39, 40 is a folding knife 43, 44 for pressing a deflected portion of a document or a stack of documents into the folding nip.

After alignment of the documents of a stack in the aligning station 16, the stack is first moved against the feeding direction and then to the folding station 32, whereby, at least if the stack is to be folded, the edge of the stack remote from the stop 26, and a portion of the stack contiguous thereto, is deflected along a pair of folding rollers 37, 38 or 39, 40 and the stack is subsequently pressed into a folding nip between the folding rollers 37, 38 or 39, 40 by one of the folding knives 43, 44. Thereupon the folding rollers are driven, so that a fold is provided in the stack.

A folding station and folding method of the type as described hereinabove is described in detail in U.S. Pat. No. 4,985,013, which is hereby referred to.

Connected to the folding station 32 is an inserter station 33. This inserter station 33 is equipped with two trays 34, 35 for envelopes. What can serve as a basis for such an inserter station is an inserter station described more in detail in the European patent application having publication No. 0781671. The inserter station has an envelope track 4 and an exit 18 for packaged mail pieces.

Figure 2A:
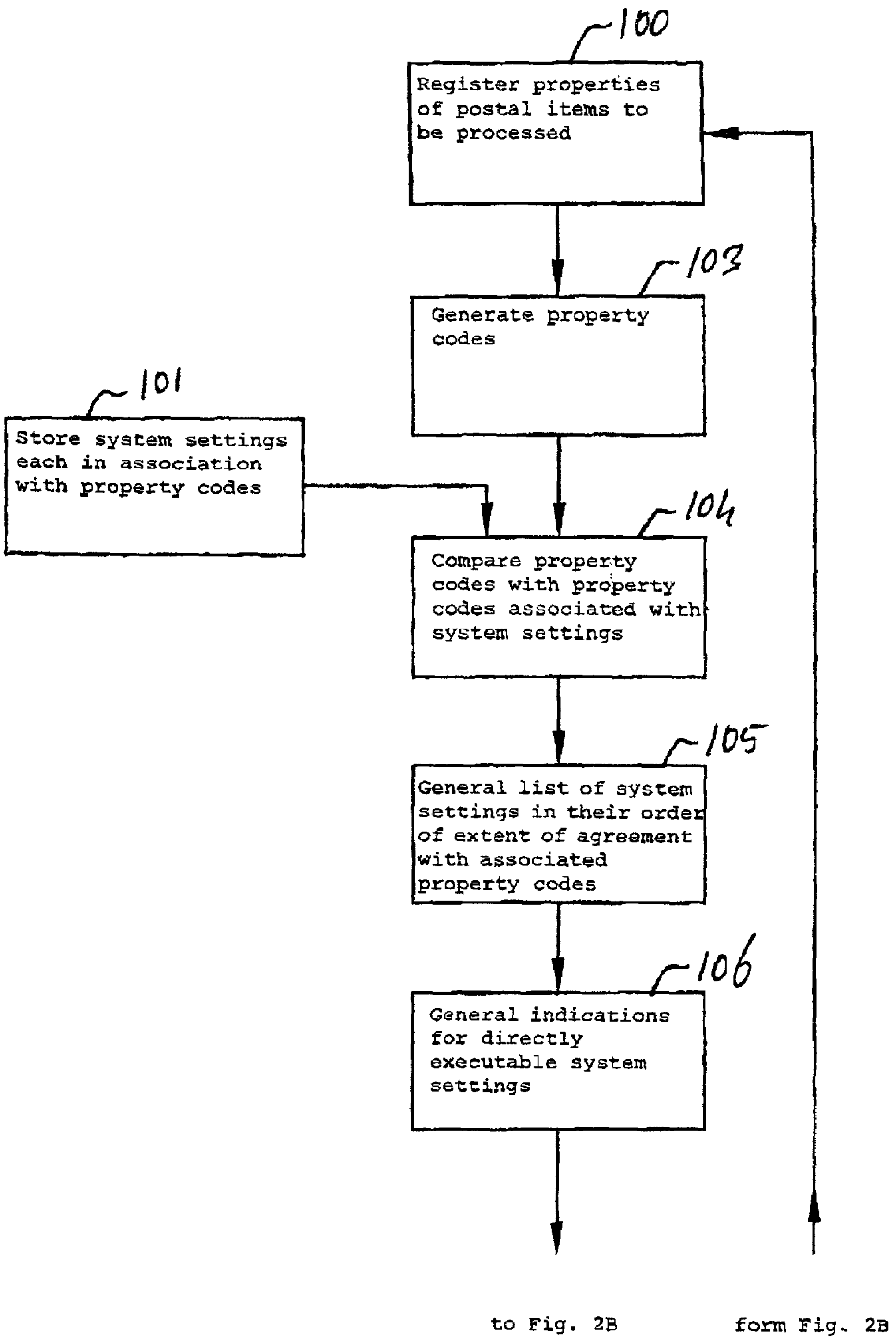
FIGS. 2A–2B represent a flow diagram of an example of a method according to the invention.
Figure 2B:
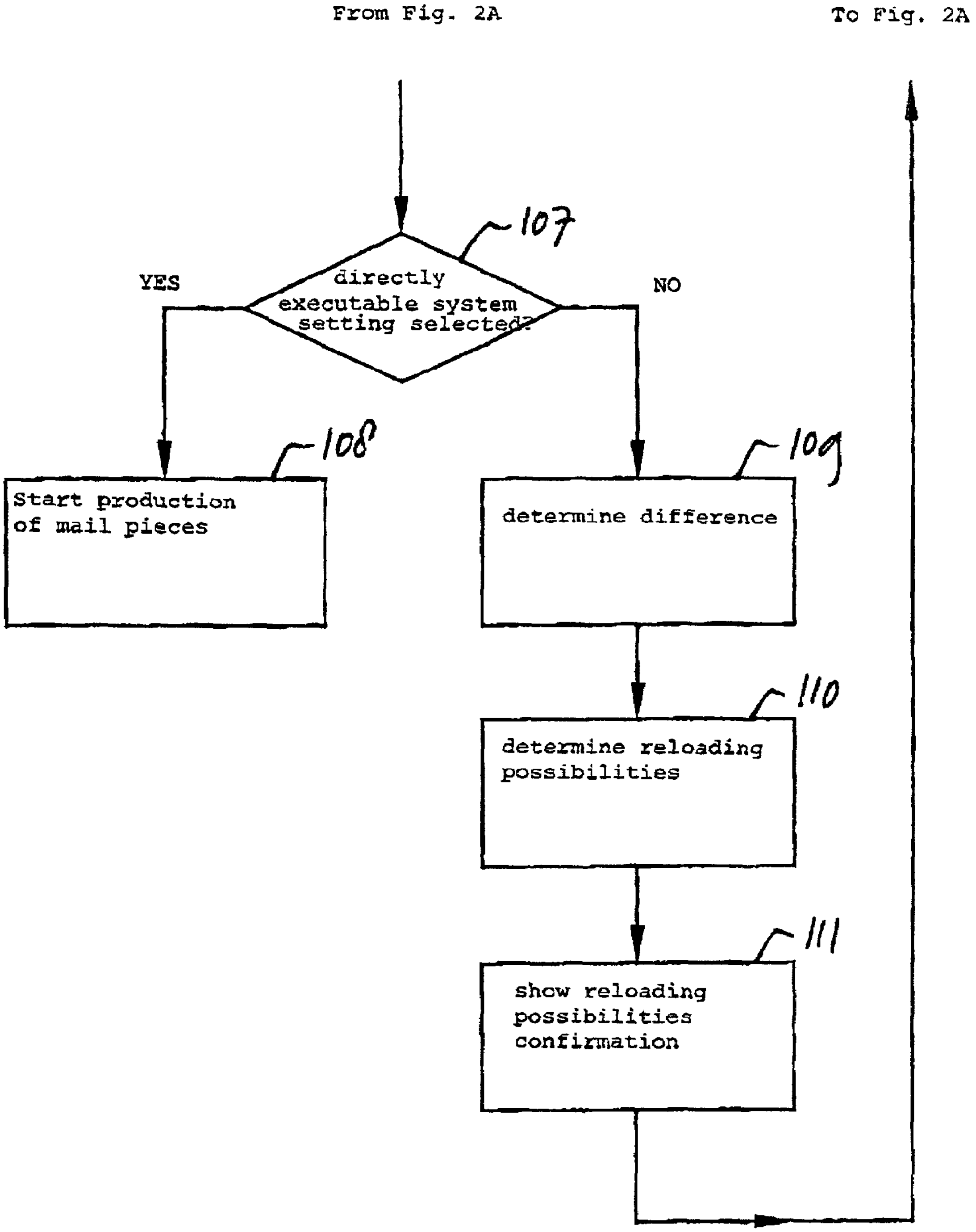

At the beginning of the setting and production operation represented in FIGS. 2A and 2B, first, in a setting phase, during a step 100 one or more properties of documents loaded into the system are registered. This is done in different ways. Documents coming from the document feeder stations and the printer are scanned by a scanner 63 which cooperates with transport rollers 27, 28, 29, 30 after they are individually transported along the scanner 63 during the start-up phase. Envelopes in the envelope feeder stations are scanned by cameras 72, 73. These are simple cameras linked to the control unit 65 through a USB bus. The registration of properties of the documents can be carried out in many alternative ways, for instance through mechanical or capacitive scanning of the thickness and/or the length (this last in combination with controlled transport of documents along the sensor). It is also possible to observe properties of all postal items to be processed with a camera before they are placed in the system. Then, however, it is preferably signaled to the system in which stations the respective documents are loaded. It is further also possible, when registering the properties of documents to be processed, to make use of data present in the memory 651, regarding postal items present in the system. If, for instance, since the loading of documents of a particular type in a particular station no 'station empty' signal has been received for that station, it can be assumed there are still documents of that type in that station. The registration of data regarding properties of postal items therefore can also proceed wholly or partly from the memory 651. The registration of properties of documents to be processed can further also be done by extracting information from the print stream which is eventually Intended for the printer 2. Thus, a typical property that identifies an invoice can be the presence of the word "total" at a fixed position on the last sheet.

Before applying the proposed method, during a setting phase, system settings have been fixed in the memory 651 in association with property codes which represent registered properties of postal items to be processed under the respective system settings (step 101).

During a start-up phase, starting from the signals coming from the sensors 63, 72, 73, property codes are generated which represent the registered property or properties (step 103). The registered property can be a property of a single document, which is characteristic of a particular system setting, such as the above-mentioned presence of a word at a predetermined position, or the presence of a particular type of envelope in one of the envelope feeder stations 72, 73. It is also possible, however, that the property code associated with a system setting for the production of a series of mail pieces represents a combination of item-type properties of one or more documents. Especially if on a system a large number of different kinds of mail pieces are to be assembled, this is advantageous for mutually distinguishing documents which are to be processed under different system settings.

Next, the property code which represents a registered property or several registered properties of postal items is compared with a reference code stored in the memory 651 which likewise represents an item-type property or item-type properties (step 104).

If the property code which represents the registered property or properties agrees at least to a defined extent with the reference code or at least one of the reference codes, the next stage is to select at least one setting code which is associated with that reference code and represents a system setting. In the method according to this example, the selection is done in several steps. First of all, a list is generated which contains all, or all preselected, setting codes in order of decreasing extent of agreement of the associated property codes with the registered property codes (step 105). The selection of the first setting code is thus done on the basis of the criterion that the extent of agreement of the associated property code with the registered property code must be greater than for all other setting codes or preselected setting codes. After this, in principle, the next stage is to start the production of mail pieces according to the first setting code of the list. In order to ensure that the loading of the system does in fact allow this production, however, it is preferred to supplement the selection process with a guarantee indication on the basis of an absolute criterion as regards the extent of agreement. To that end, for each of the setting codes on the list, further an indication is generated which indicates whether the production of mail pieces under the system setting associated with the respective setting code and according to the associated specifications is directly possible (step 106).

If a verification (step 107) shows that this is the case, the start-up phase is ended and the production of mail pieces is started (step 108), optionally after a confirmation command of the operator. It is noted that the system setting can comprise, for instance, the instruction that, depending on signs read from main documents, selectively, envelopes are selected or inserts are added. These separately read instructions in each case concern an individual mail piece and do not constitute system settings that apply to a whole series of mail pieces to be produced.

If the verification (step 107) shows that none of the system settings associated with the setting codes is directly executable, the start-up phase is continued, proceeding to the determination of the difference between the required property code for producing mail pieces under a system setting associated with the setting code selected first and the current property code (step 109).

Starting from the difference as determined, reloading possibilities are determined (step 110) and represented (step 111). This last can be done both optically, with the aid of the display 67, and auditorily, with the aid of a speech module, an amplifier and a loudspeaker. The reloading possibilities are shown until the operator has entered a confirmation command signifying that reloading has been completed. If this is the case, the properties of the postal items to be processed are registered again.

A particular advantage of the method according to the proposed example is that the operator can first make a preselection of system settings to be used, and subsequently the system settings, ordered according to the extent to which they best fit the current loading condition of the system, are represented, together with directions as to which loading and unloading operations are to be performed to enable execution of the production of mail pieces under the different system settings. The operator is thus assisted in choosing a sequential order of jobs to be executed that entails a minimal, or at least relatively small, amount of reloading work. Naturally, when determining the order of several jobs, additionally a sorting algorithm can be applied, which takes advance account of the mutual differences between loadings associated with different jobs.

The preselection of setting codes representing system settings, which are each coupled to a reference code on the basis of extent of agreement with the code generated starting from the registered item-type property or properties, as according to step 105 and, depending on the situation, also step 106, makes it further possible to select a setting code from the preselected setting codes, for instance because the operator meanwhile knows which of the proposed system settings are to be applied.

The registration of item-type properties of the envelopes is done in the area of the envelope feeder stations 34, 25 of the system. This provides the advantage that the properties of the envelopes can be registered in loaded condition and without transport through the system.

It will be clear to one skilled in the art that the proposed method, for instance as laid down in the flow diagram in FIG. 2, can also be laid down in separate computer software for setting a system for the production of mail pieces.

What is claimed is:

1. A method for machine-producing a series of mailpieces for a system for assembling mailpieces, the method comprising a setting phase, a start-up phase following said setting phase and an operating phase following said start-up phase, said setting phase comprising the steps of:

A. inputting a reference code representing an inherent item-type property of physical postal items;

B. inputting a setting code associated with the reference code, the setting code identifying a set of pre-stored system settings; and C. the system storing said reference code and said setting code in a memory, in mutually coupled relationship;

the system during said start-up phase comprising the steps of:

D. scanning at least one physical postal item and registering an inherent item-type property thereof;

E. generating a property code representing at least the registered property;

F. searching said memory and comparing said generated property code with the reference code which represents the scanned item-type property; and G. in response to at least a defined extent of agreement between the compared property code and the reference code, selecting the selling code associated with said reference code;

H. wherein the reference code, the setting code, and the property code are not attached to the at least one physical postal item;

the operating phase comprising the step of:

producing a series of mailpieces each including said at least one scanned physical item in accordance with the selected selling code.

2. A method according to claim 1, step D further comprising registering at least one other inherent item-type property of physical postal items, wherein:

said generated property code of step E represents a combination of the registered properties of the physical postal items;

the setting code is selected in step G in response to at least a defined extent of agreement between said generated code and a reference code coupled to said setting code, which reference code represents a combination of the item-type properties.

3. A method according to claim 2, wherein the item-type properties of at least two items of different types are registered in step D.

4. A method according to claim 1, wherein selecting the setting code in step G comprises: preselecting at least two setting codes each representing pre-stored system settings, said setting codes each being coupled to one of the reference codes that are at least to a defined extent in agreement with said code generated from the at least one registered property; and selecting one of said preselected setting codes.

5. A method according to claim 4, further comprising representing said preselected setting codes, or said system settings represented thereby, in humanly perceptible form; wherein electing one of said preselected setting codes includes inputting a choice from said represented setting codes or said system settings represented thereby.

6. A method according to claim 4, wherein the selection of one of said preselected setting codes depends on agreement between system settings represented by said preselected setting codes and a current system setting.

7. A method according to claim 4, wherein the selection of one of said preselected setting codes depends on agreement between item types associated with system settings represented by said preselected setting codes and the types of the physical postal items present in the system.

8. A method according to claim 1, wherein the registering of the property in step D is carried out in the area of a feeder station of the system.

9. A method according to claim 1, further comprising determining a difference between a current loading condition of the system for assembling mailpieces and a required loading condition for assembling mailpieces in accordance with said set of system settings associated with said selected setting code, and signaling an indication associated with said difference.

10. A method according to claim 1, wherein step A comprises inputting a plurality of reference codes representing respective inherent item-type properties of physical postal items, step B comprises inputting setting codes associated with respective reference codes, each setting code representing a set of pre-stored system settings; and further comprising:

determining at least two differences between a current loading condition of the system for assembling mailpieces and at least two loading conditions, each required for assembling mailpieces in accordance with one of at least two of said system settings associated with at least two of said selected setting codes;

determining a smallest one of said at least two differences; and selecting as first setting code, one of said at least two selected setting codes that belongs to the one of the system settings for which the difference between the required loading condition and the current loading condition of the system for assembling mailpieces is the smallest.

11. A method according to claim 1, wherein step A includes inputting a reference code representing at least a length of a postal item.

12. A method according to claim 1, wherein step A includes inputting a reference code representing at least a thickness of a postal item.

13. A method according to claim 1, wherein step A includes inputting a reference code defined by humanly readable text on a postal item.

14. A computer readable storage medium carrying a computer readable computer program for setting a system for producing mailpieces, comprising instructions for:

during a setting phase:

receiving at least one inputted reference code representing at least one inherent item-type property of physical postal items of a particular type;

receiving at least one inputted setting code representing at least one system setting; and causing the system to store said at least one reference code and said at least one setting code in a memory, in mutually coupled relationship;

during a start-up phase following said setting phase:

causing the system to extract from at least one physical postal item and to register at least one property from the at least one physical postal item;

generating a property code representing the at least one registered property;

comparing said property code representing the at least one registered property with the at least one reference code, stored in the memory, which represents the at least one item-type property; and in response to at least a defined extent of agreement between the at least one code representing the registered property and the reference code or at least one of the reference codes, selecting at least one setting code, associated with said reference code or said at least one of the reference codes, which represents a system setting;

wherein the at least one reference code, the at least one setting code, and the at least one property code are not attached to the at least one physical postal item; and during an operating phase following said start-up phase:

causing a series of mailpieces to be produced, each including at least one of said items of said item type, in accordance with the at least one selected setting code.

15. A system for producing a series of mailpieces comprising:

at least one station for processing postal items into mailpieces;

a sensor, for sensing at least one physical postal item and for registering at least one inherent item-type property from the at least one physical postal item;

a control structure communicatively linked with said sensor for receiving signals from said sensor, which signals represent the at least one property of the at least one physical postal item;

a memory for storing at least one reference code representing at least one item-type property of physical postal items of a particular type and at least one setting code representing a system setting associated with said reference code, which memory is communicatively linked with said control structure;

wherein the control structure is arranged for:

during a setting phase:

receiving at least one inputted reference code representing at least one item-type property of physical, postal items of a particular type;

receiving at least one inputted setting code representing at least one system setting; and storing said reference code and said setting code in a memory, in mutually coupled relationship;

during a start-up phase following said setting phase:

comparing the signals from the sensor with said reference code or reference codes stored in the memory, and in response to at least a defined extent of agreement between the signals from the sensor and the reference code or at least one of the reference codes, selecting at least one setting code, associated with said reference code or said at least one of the reference codes, which represents a system setting;

wherein the at least one reference code, and the at least one setting code, are not attached to the at least one physical postal item;

during an operating phase following said start-up phase;

causing said at least one station to produce a series of mailpieces, each including at least one of said items of said items of said item-type, with the system set in accordance with the selected setting code.

* * * * *